United States Patent Office 3,297,547
Patented Jan. 10, 1967

3,297,547
METHOD OF MANUFACTURING AMYLOLYTIC ENZYMES
Eijiro Matsutani, Kitamura, Itami-shi, Hyogo-ken, Michiho Sato, Sumiyoshi-ku, Osaka-shi, and Fumio Hattori, Toyonaka-shi, Osaka-fu, Japan, assignors to Matsutani Chemical & Company, Limited, Hyogo-ken, Japan
No Drawing. Filed Dec. 2, 1963, Ser. No. 327,537
5 Claims. (Cl. 195—66)

This invention relates to the method of manufacturing amylolytic enzymes. More particularly, the invention pertains to a novel method of producing amylolytic enzymes by the culture of a specific microorganism in a medium containing as an additional ingredient a higher fatty acid, an ester thereof and/or natural oil or fat.

In the prior art, amylolytic enzymes are produced by culturing an amylolytic enzyme-producing microorganism in a medium containing as the effective ingredient a carbon source and a nitrogen source. There are occasionally added an inorganic salt, a vitamin and the like to facilitate the culture of said enzymes.

The major object of the present invention is to provide a method of producing amylolytic enzymes having a strong saccharification activity running to from 2 to 10 times as large as that of the conventional amylolytic enzymes.

Other objects and specific features of the invention will be made apparent from the description to be disclosed hereinafter.

The present invention is based upon the discovery that a specific amylolytic enzyme-producing microorganism produces an amylolytic enzyme having a marked saccharification activity when cultured in a medium with at least one species of higher fatty acids, higher fatty acid esters and natural oils and fats.

The microorganisms employed in the invention are confined to those species belonging to Endomycopsis sp., *Endomycopsis fibuliger, Endomyces hordei, Endomycopsis lindneri* and *Endomycopsis javanensis*.

Of said microorganisms, Endomycopsis sp. (initially disclosed in Japanese Patent 35/15,438 (1960)) is a microorganism belonging to the genus Endomycopsis and having an ability to produce an amylolytic enzyme and is preserved as IFO 0111 at the Institute for Fermentation, 54, Jusonishinocho 4-chome, Higashiyodo-gawa-ku, Osaka, Japan, and is also identified in Hattori, Agricultural and Biological Chemical Society (Japan), 1961, vol. 25, No. 10, pages 737–743, as Endomyces sp. IFO 0111. Microorganisms other than the specified above can hardly produce the desired effert of the present invention, although they can be treated with the media of the same nature. For the saccharification activity of the resultant enzymes cannot be raised to the order higher than the conventional.

The culture base employed in the invention is prepared in the conventional manner with starches, cereals, cereal powders, dextrins, glucoses and other sugars and the like as a carbon source, and with wheat brans, soybean meals, defatted soybeans, rice brans, peptones, yeast extracts and the like as a nitrogen source. There may be added an inorganic salt and/or a vitamin where necessary.

In the present invention, there is added to the aforesaid culture base one or more species of higher fatty acids having 12 or more carbon atoms, esters thereof and natural oils and fats. Of said fatty acids and esters, particularly desirable effects can be obtained with saturated fatty acids and esters and unsaturated fatty acids and esters having one double bond. Those unsaturated fatty acids and esters having 2 or more double bonds can be used, but do not produce the most desired effects. And the natural oils and fats specified above include lard, corn, soybean, cottonseed, sesame, olive, peanut, oleo and the like oils.

In the present invention, desirable effects are produced when one or more species of said acids, esters and natural oils and fats are added in the order of from 0.1 to 15 percent, particularly the best results from 3 to 5 percent by weight of the culture base. The desired effects of the present invention cannot be obtained when said ingredient is added in an order less than 0.1 weight percent, and a fall in the ultimate yield in inevitable with said ingredient used in an order more than 15 weight percent.

In practice, any of the microorganisms specified above is inoculated in the aforesaid culture medium sterilized with heat under increased pressure, and the organism is cultured at a temperature from 25° to 35° C. in accordance with the solid, shaking or submerged culture method known in the art. The resultant microorganisms exhibit a marked growth about 2 days after inoculation, and the highest order of amylolytic enzyme production is obtained from 3 to 15 days after inoculation.

Preferred examples are as follows, which are illustrative only and in which all percentage is by weight. The measurement of saccharification activity disclosed therein was carried out in accordance with Ono's method by multiplying with the order of enzyme concentration the starch-decomposing ratio of the enzyme employed in the order of 10 cc. in 2 percent starch solution at 55° C. for 1 hour (Fermentation Research Institute Report 6104 (1951), Agency of Industrial Science and Technology, Tokyo, Japan).

*Example 1*

To 100 mls. of a medium consisting of 3% meat extract, 1% starch and 0.1% potassium biphosphate was added 3% stearic acid, and the preparation was sterilized in an autoclave for 15 minutes with steam supplied at 120° C. under a gauge pressure of 1.05 kg./cm.$^2$ (15 lb./in.$^2$). After cooling, there was inoculated in the resultant medium a platinum loopful of Endomycopsis sp., and the inoculated medium was incubated in a 500 mls. shaker at the rate of 140 strokes per minute, producing an amylolytic enzyme solution of a high order of saccharification activity from 7 to 10 days after inoculation. Findings obtained were as follows:

| Incubation period in day | Stearic acid containing medium | | Control medium | |
|---|---|---|---|---|
| | pH | saccharification activity | pH | saccharification activity |
| 4 | 5.4 | 600 | 6.9 | 280 |
| 6 | 5.5 | 1,200 | 6.8 | 300 |
| 8 | 5.5 | 1,600 | 6.9 | 300 |
| 10 | 5.6 | 1,700 | 6.9 | 290 |

*Example 2*

To 100 mls. of a medium consisting of 5% defatted soybean, 1% starch and 0.1% potassium biphosphate was added sesame oil in the varigated order of from 1 to 10%, and Endomycopsis sp. was incubated in the resultant medium, sterilization and incubation being carried out in accordance with the manners as disclosed in Example 1, except incubation period being extended to from 5 to 15 days. Findings obtained were as follows:

| Incubation period in day | Saccharification activity | | | | | |
|---|---|---|---|---|---|---|
| | Amount of sesame oil added in percent | | | | | Control medium |
| | 1 | 3 | 5 | 7.5 | 10 | |
| 5 | 500 | 530 | 630 | 680 | 480 | 350 |
| 10 | 530 | 1,800 | 1,880 | 1,540 | 1,470 | 350 |
| 15 | 530 | 3,000 | 3,100 | 3,440 | 1,950 | 300 |

Example 3

To 100 mls. of a medium consisting of 2% corn-steep-liquor and 1% starch was added 3% oleic acid, and Endomycopsis sp. was incubated in the resultant medium, sterilization and incubation being carried out in accordance with the manners as described in Example 2. Findings obtained were as follows:

| Incubation period in day | Saccharification activity | |
|---|---|---|
| | Medium containing oleic acid | Control medium |
| 5 | 400 | 180 |
| 10 | 550 | 180 |
| 15 | 620 | 200 |

Example 4

To 100 mls. of a medium consisting of 3% wheat bran and 1% starch were added 2% stearic acid and 1% palmitic acid, and Endomycopsis fibuliger was incubated in the resultant medium, sterilization and incubation being carried out in accordance with the manners as disclosed in Example 2. Findings obtained were as follows:

| Incubation period in day | Saccharification activity | |
|---|---|---|
| | Medium containing stearic and palmitic acids | Control medium |
| 5 | 1,000 | 500 |
| 10 | 1,500 | 600 |
| 15 | 1,900 | 600 |

Example 5

To 100 mls. of a medium consisting of 3% corn-steep-liquor and 2% starch was added 3% camellia oil, and Endomycopsis fibuliger was incubated in the resultant medium, sterilization and incubation being carried out in accordance with the manners as disclosed in Example 2. Findings obtained were as follows:

| Incubation period in day | Saccharification activity | |
|---|---|---|
| | Medium containing camellia oil | Control medium |
| 5 | 1,270 | 280 |
| 10 | 1,790 | 300 |
| 15 | 2,000 | 300 |

Example 6

To 100 mls. of a medium consisting of 3% corn-steep-liquor and 2% starch were added 1% rice bran oil, 1% colza oil and 1% corn oil, and Endomyces hordei was incubated in the resultant medium, sterilization and incubation being carried out in accordance with the manners as described in Example 2. Findings obtained were as follows:

| Incubation period in day | Saccharification activity | |
|---|---|---|
| | Medium containing rice bran oil, colza oil and corn oil | Control medium |
| 5 | 1,150 | 200 |
| 10 | 1,250 | 280 |
| 15 | 1,300 | 280 |

Example 7

To 100 mls. of a medium consisting of 3% corn-steep-liquor and 2% starch was added 3% rice bran oil, and Endomycopsis lindneri was incubated in the resultant medium, sterilization and incubation being carried out in the same manners as described in Example 2. Findings obtained were as follows:

| Incubation period in day | Saccharification activity | |
|---|---|---|
| | Medium containing rice bran oil | Control medium |
| 5 | 300 | 200 |
| 10 | 700 | 250 |
| 15 | 800 | 250 |

Example 8

To 100 mls. of a medium consisting of 3% corn-steep-liquor and 2% starch was added 3% colza oil, and Endomycopsis javanensis was incubated in the resultant medium, sterilization and incubation being carried out in accordance with the manners as disclosed in Example 2. Findings obtained were as follows:

| Incubation period in day | Saccharification activity | |
|---|---|---|
| | Medium containing colza oil | Control medium |
| 5 | 800 | 250 |
| 10 | 1,200 | 300 |
| 15 | 1,400 | 300 |

We claim:

1. In a method of producing an amylolytic enzyme by culturing a microorganism selected from the group consisting of Endomyces sp. IFO 0111, Endomycopsis fibuliger, Endomyces hordei, Endomycopsis lindneri and Endomycopsis javanensis in a culture therefor the step of incorporating in the medium used for said culture, in the order of from 0.1 to 15 weight percent of at least one species selected from the group consisting of higher fatty acids, higher fatty acid esters and natural oils and fats as an additional ingredient.

2. The method of claim 1, in which said higher fatty acids are saturated, each having at least 12 carbon atoms.

3. The method of claim 1, in which said higher fatty acids are unsaturated, each having one double bond and at least 12 carbon atoms.

4. The method of claim 1, in which said higher fatty acid esters are saturated, each having at least 12 carbon atoms.

5. The method of claim 1, in which said higher fatty acid esters are unsaturated, each having one double bond and at least 12 carbon atoms.

References Cited by the Examiner

UNITED STATES PATENTS

| 2,888,385 | 5/1959 | Grandel | 195—67 |
| 2,890,989 | 6/1959 | Anderson | 195—78 |
| 3,063,914 | 11/1962 | Von Polnitz et al. | 195—66 |
| 3,186,919 | 6/1965 | Rupe | 195—66 |

FOREIGN PATENTS 35-15,438  10/1960  Japan.

OTHER REFERENCES

Hattori: Agricultural and Biological Chemical Society (Japan), 1961, vol. 25, No. 10, pp. 737–743.

A. LOUIS MONACELL, *Primary Examiner.*

L. M. SHAPIRO, *Assistant Examiner.*